United States Patent
Holland et al.

(10) Patent No.: US 10,141,031 B2
(45) Date of Patent: Nov. 27, 2018

(54) STORAGE SYSTEM AIRFLOW IMPEDANCE REGULATOR

(71) Applicant: Lenovo Enterprise Solutions (Singapore) Pte. Ltd., Singapore (SG)

(72) Inventors: Jeffrey Scott Holland, Newton, NC (US); Shareef Fathi Alshinnawi, Apex, NC (US); Bejoy Jose Kochuparambil, Apex, NC (US); Aparna Vallury, Apex, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 335 days.

(21) Appl. No.: 14/997,387

(22) Filed: Jan. 15, 2016

(65) Prior Publication Data

US 2017/0205835 A1    Jul. 20, 2017

(51) Int. Cl.
*G05D 11/00* (2006.01)
*G11B 33/14* (2006.01)
*G11B 33/12* (2006.01)

(52) U.S. Cl.
CPC .......... *G11B 33/142* (2013.01); *G11B 33/128* (2013.01)

(58) Field of Classification Search
CPC .............................. G11B 33/142; G11B 33/128
USPC ........................................................ 700/282
See application file for complete search history.

(56) References Cited

U.S. PATENT DOCUMENTS

| 2012/0053906 A1* | 3/2012 | Sherman | G09B 23/12 703/1 |
| 2014/0177164 A1* | 6/2014 | Stewart | H05K 7/20145 361/679.46 |
| 2014/0179214 A1* | 6/2014 | Rinke | H05K 7/20727 454/184 |
| 2014/0277784 A1* | 9/2014 | Mick | G05D 23/1917 700/286 |
| 2015/0237908 A1* | 8/2015 | Burkett | A23L 3/3418 426/231 |

* cited by examiner

*Primary Examiner* — Vu A Vu
(74) *Attorney, Agent, or Firm* — Zilka-Kotab, P.C.

(57) ABSTRACT

A system according to one embodiment includes a storage bay having a peripheral sidewall defining an interior dimensioned to receive a data storage device therein, at least one flap coupled to the peripheral sidewall, a retention mechanism configured to retain the at least one flap in the retracted position, and an electronic connector coupled to the retention mechanism and configured to pass control signals to the retention mechanism. The at least one flap is positionable between a retracted and deployed position. The at least one flap substantially blocks airflow through the interior of the peripheral sidewall when the at least one flap is in the deployed position, and does not significantly block airflow through the interior of the peripheral sidewall when the at least one flap is in the retracted position. The retention mechanism is electronically controllable to cause the at least one flap to move toward the deployed position.

21 Claims, 4 Drawing Sheets

STORAGE SYSTEM AIRFLOW IMPEDANCE REGULATOR

FIELD OF THE INVENTION

The present invention relates to storage systems, and more particularly, this invention relates to the airflow impedance of storage systems including at least one storage bay.

BACKGROUND

Establishing and maintaining optimum airflow characteristics throughout a storage system environment may be functionally desirable, e.g., to promote cooling of the system, regardless of the system configuration. One of the most undesirably impactful components to a storage system's airflow may be the storage configuration, or drive population. Where a storage system has unused storage bays, industry standards may call for a removable drive filler to be used in place of a drive to fill the entirety of the storage bay, e.g., in an attempt to maintain optimum airflow characteristics by creating a high airflow impedance. Removable drive fillers, however, tend to be costly accessories that are often lost or thrown away by users who do not want to store them and/or insert or remove them from storage system drives each time a drive configuration changes. These actions may lead to functionality issues if the user decides that he or she no longer needs to operate with a fully populated drive configuration. For example, removing drives from a storage bay without replacing the drive with a removable drive filler may substantially alter airflow pathways by decreasing airflow impedance within the storage system.

SUMMARY

A system according to one embodiment includes a storage bay having a peripheral sidewall defining an interior dimensioned to receive a data storage device therein, at least one flap coupled to the peripheral sidewall, a retention mechanism configured to retain the at least one flap in the retracted position, and an electronic connector coupled to the retention mechanism and configured to pass control signals to the retention mechanism. The at least one flap is positionable between a retracted position and a deployed position. The at least one flap substantially blocks airflow through the interior of the peripheral sidewall when the at least one flap is in the deployed position. The at least one flap does not significantly block airflow through the interior of the peripheral sidewall when the at least one flap is in the retracted position. The retention mechanism is electronically controllable to cause the at least one flap to move toward the deployed position.

A method for controlling airflow impedance in a storage bay according to another embodiment includes determining whether a data storage device is in a storage bay, and controlling a retention mechanism in response to the determining. The retention mechanism is configured to selectively retain at least one flap in a retracted position. The at least one flap is positionable between the retracted position and a deployed position. The at least one flap substantially blocks airflow through an interior of a peripheral sidewall when the at least one flap is in the deployed position. The at least one flap does not significantly block airflow through the interior of the peripheral sidewall when the at least one flap is in the retracted position.

A computer program product according to yet another embodiment includes a computer readable storage medium having program code stored thereon, the program code executable by a computer to cause the computer to perform a process including determining whether a data storage device is in a storage bay, and controlling a retention mechanism in response to the determining. The retention mechanism is configured to selectively retain at least one flap in a retracted position. The at least one flap is positionable between the retracted position and a deployed position. The at least one flap substantially blocks airflow through the interior of the peripheral sidewall when the at least one flap is in the deployed position. The at least one flap does not significantly block airflow through the interior of the peripheral sidewall when the at least one flap is in the retracted position.

Other aspects and advantages of the present invention will become apparent from the following detailed description, which, when taken in conjunction with the drawings, illustrate by way of example the principles of the invention.

DETAILED DESCRIPTION

Figure 1:
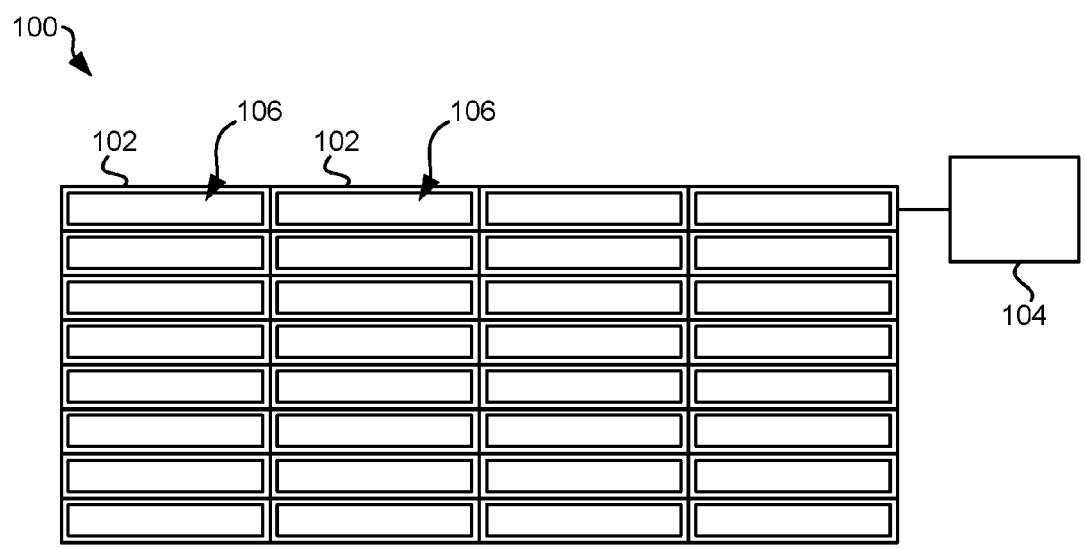
FIG. 1 is a side view of a storage bay system, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of storage system airflow impedance regulators and/or related systems and methods.

In one general embodiment, a system includes a storage bay having a peripheral sidewall defining an interior dimensioned to receive a data storage device therein, at least one flap coupled to the peripheral sidewall, a retention mechanism configured to retain the at least one flap in the retracted position, and an electronic connector coupled to the retention mechanism and configured to pass control signals to the retention mechanism. The at least one flap is positionable between a retracted position and a deployed position. The at least one flap substantially blocks airflow through the interior of the peripheral sidewall when the at least one flap is in the deployed position. The at least one flap does not significantly block airflow through the interior of the peripheral sidewall when the at least one flap is in the retracted position. The retention mechanism is electronically controllable to cause the at least one flap to move toward the deployed position.

In another general embodiment, a method for controlling airflow impedance in a storage bay includes determining whether a data storage device is in a storage bay, and controlling a retention mechanism in response to the determining. The retention mechanism is configured to selectively retain at least one flap in a retracted position. The at least one flap is positionable between the retracted position and a deployed position. The at least one flap substantially blocks airflow through an interior of a peripheral sidewall when the at least one flap is in the deployed position. The at least one flap does not significantly block airflow through the interior of the peripheral sidewall when the at least one flap is in the retracted position.

In yet another general embodiment, a computer program product includes a computer readable storage medium having program code stored thereon, the program code executable by a computer to cause the computer to perform a process including determining whether a data storage device is in a storage bay, and controlling a retention mechanism in response to the determining. The retention mechanism is configured to selectively retain at least one flap in a retracted position. The at least one flap is positionable between the retracted position and a deployed position. The at least one flap substantially blocks airflow through the interior of the peripheral sidewall when the at least one flap is in the deployed position. The at least one flap does not significantly block airflow through the interior of the peripheral sidewall when the at least one flap is in the retracted position.

As noted above, previous attempts at regulating airflow entailed insertion of a removable drive filler to fill the perimeter of an empty storage bay in place of a drive. When a removable drive filler is used improperly or not at all, the airflow impedance in the storage system is undesirably decreased. Moreover, the resulting airflow issues tend to be prolonged, e.g., due to a user's reluctant to replace an expensive drive filler after discarding it and/or forgetting or choosing to replace an unpopulated storage bay with a drive filler each time a drive is removed from the storage system. The result of the reduced airflow impedance is a reduction in airflow-induced cooling, which may ultimately lead to heat-induced degradation of components of the storage system, drive failure, etc.

In contrast, various embodiments herein include one or more storage system impedance regulators for ensuring that a storage system's impedance and/or safety requirements, from a drive perspective, are maintained and optimized. Such embodiments may also ensure that electromagnetic compatibility (EMC) requirements of the storage system are sufficiently established and maintained.

A "storage system" as used herein may include one storage bay, or many storage bays. The storage system may be a standalone storage system, in one embodiment, e.g., that receives data from another system such as a server, host, another storage system, etc. In other embodiments, the storage system may be a portion of a larger system, e.g., as a storage component of a computer or server system, a portion of a larger storage system, etc.

FIG. 1 depicts a storage system 100 in accordance with one embodiment. As an option, the present storage system 100 may be implemented in conjunction with features from any other embodiment listed herein, such as those described with reference to the other FIGS. Of course, however, such storage system 100 and others presented herein may be used in various applications and/or in permutations which may or may not be specifically described in the illustrative embodiments listed herein. Further, the storage system 100 presented herein may be used in any desired environment.

Storage system 100 includes storage bays 102. Although storage system 100 is illustrated in FIG. 1 to include a 4×8 array of storage bays 102, the configuration and/or number of storage bays 102 in other storage systems may vary in other embodiments.

Figure 2:
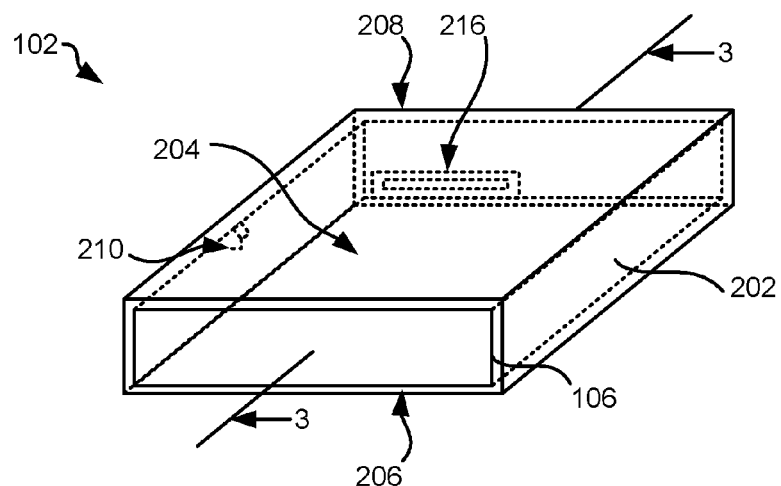
FIG. 2 is a perspective view of a storage bay, in accordance with one embodiment.

Referring momentarily to FIG. 2, a more detailed perspective view of one of the storage bays 102 of storage system 100 is shown and will now be described below. It should be noted that detailed views of the storage bays 102 in FIGS. 2-3 may be referred to herein to provide detailed drawings and descriptions of system 100.

FIG. 2 depicts a storage bay system, hereinafter "storage bay" 102 in accordance with one embodiment. As an option, the present storage bay 102 may be implemented in conjunction with features from any other embodiment listed herein, such as those described with reference to the other FIGS. Of course, however, such storage bay 102 and others presented herein may be used in various applications and/or in permutations which may or may not be specifically described in the illustrative embodiments listed herein. Further, the storage bay 102 may be used in any desired environment.

The storage bay 102 has a peripheral sidewall 202 defining an interior 204 dimensioned to receive a data storage device (not shown) therein.

The peripheral sidewall 202 may be constructed of any conventional material, such as a metal, plastic, etc. In one approach, the peripheral sidewall 202 may electromagnetically shield a data drives inserted in the storage bay 102, e.g., to prevent electromagnetic interference between the inserted data drives and other devices in close proximity thereto, to meet industry standard electromagnetic capability (EMC) guidelines, for reasons that would be appreciated by one skilled in the art upon reading the present disclosure, etc.

The interior 204 of the storage bay 102 extends between front and back ends 206, 208 of the peripheral sidewall 202. Preferably, the back end 208 is configured to allow airflow to pass therethrough, e.g., for convective cooling of a drive in the interior 204 of the storage bay 102. For example, the back end 208 may be open, have apertures therein (e.g., holes, slots, etc.), etc.

The storage bay 102 may have at least one connector 216 configured to mate with a connector of the data storage device. The connector 216 and/or data storage device may be of a type known in the art. The mating between the connector 216 and the connector of a data storage device may be established, e.g., by a press fit coupling, by a contact electrical coupling, by an electrical coupling of a type known in the art, etc., when the data storage device is inserted into the storage bay 102.

Although the connector 216 is shown on the back end 208 of the storage bay 102, according to further embodiments, the location and/or and mating action between the connector 216 of the storage bay 102 and the connector of a data storage device may vary. For example, the mating between the connector 216 of the storage bay 102 and the connector of a data storage device may occur along the peripheral sidewall 202. In further approaches, the storage bay 102 may not have a connector.

The storage bays 102 of system 100 may be configured to accept hot-swap drives. If the hot-swap drive(s) is dimensionally larger than the storage bay is configured to allow, the retention mechanism 210 may be configured to actuate via the insertion of the hot-swap drive.

Storage system 100 also includes at least one flap 106 integrally or detachably coupled to the peripheral sidewall (see peripheral sidewall 202 of FIG. 2). As shown in FIG. 2, the flap(s) can be at the front end 206 of the storage bay 102. However, in other embodiments, the flap may be located at the back end 208 of the storage bay 102, at some location between the front end 206 and the back end 208 of the storage bay 102, etc.

Figure 3:
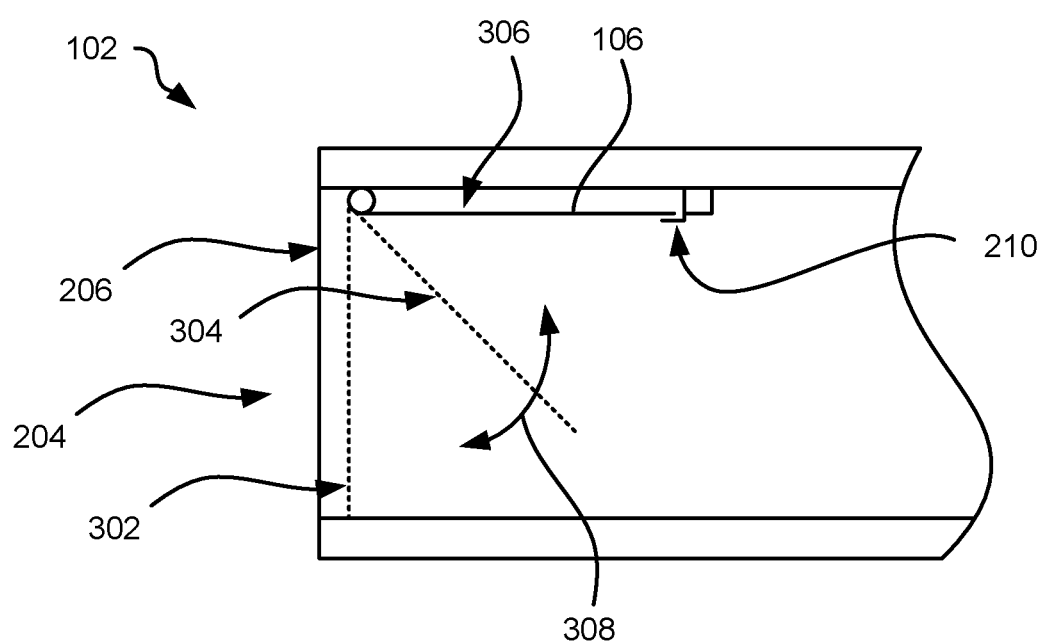
FIG. 3 is a partial cross-sectional view of the storage bay of FIG. 2 taken along line 3-3 of FIG. 2.

In the embodiment shown in FIGS. 2 and 3, a single flap 106 is present, and has approximate dimensions of the opening in the front end of the storage bay 102. However, in other embodiments, more than one flap may be present. See, e.g., the embodiments of FIGS. 4A-4C.

Referring again to FIGS. 2 and 3, the flap 106 may be positionable between a retracted position and a deployed position. For example referring momentarily to FIG. 3, a side view of the storage bay 102 is shown taken along line 3-3 of FIG. 2 to show the transition path 308 of the flap 106 from the deployed position 302 into the retracted position 306. A mid-transition position 304 of the flap 106 is illustrated to further depict the transition of the flap 106 from the deployed position 302 into the retracted position 306 and vice versa.

The flap 106 may substantially block airflow through the interior 204 of the peripheral sidewall 202 when the flap 106 is in the deployed position 302. Substantially blocking airflow through the interior 204 of the peripheral sidewall 202 when the flap 106 is in the deployed position 302 may maintain optimum airflow characteristics, e.g., airflow impedance in the storage bay 102. Substantially blocking airflow through the interior 204 of the peripheral sidewall 202 of storage bay 102 may also reduce occurrence of the airflow system, e.g., fans, of system 100 from having to throttle to maintain a proper airflow, e.g., due to airflow escaping out of a storage bay having a flap in the retracted position and no drive in the storage bay. By not having to throttle the airflow systems of system 100, power consumptions of system 100 may also remain considerably low.

The flap 106 may be biased towards the deployed position 302, e.g., via a spring, gravity, and/or other known biasing mechanism. Biasing the flap 106 towards the deployed position 302 may enable airflow blockage through the interior 204 of the peripheral sidewall 202 by maintaining the flap 106 in the deployed position 302.

The flap 106 does not significantly block airflow through the interior 204 of the peripheral sidewall 202 may be oriented substantially perpendicular to the deployed position 302 when the flap 106 is in the retracted position 306. In some embodiments, the flap 106 may be oriented substantially perpendicular to the deployed position 302 when the flap 106 is in the retracted position 306. For example, according to various embodiments, the flap 106 may be oriented at least 75 degrees from the deployed position 302. The flap may be deemed to not significantly block airflow through the interior of the peripheral sidewall when at least 75% of an otherwise unimpeded volumetric airflow is allowed to pass through the interior of the peripheral sidewall, where an unimpeded airflow therethrough is measured when the flap is entirely absent and the air pressure differentials on both ends of the peripheral sidewall are within the ranges found under normal operating conditions.

The orientation of the flap 106 in the retracted position 306 may vary depending on the preferred embodiment. For example, in some approaches, the flap 106 may curl or become furled when the flap 106 is in the retracted position 306.

As shown in FIG. 2, the storage bay 102 may include a retention mechanism 210. The retention mechanism 210 may be configured to retain, e.g., selectively retain, the flap 106 in the retracted position 306. The retention mechanism 210 may be electronically controllable to cause the flap 106 to move toward the deployed position 302, e.g., along the transition path 308. For example, as shown in FIG. 3, the retention mechanism 210 may include a latch for holding the flap 106 in the retracted position 306. Although a single latch is shown in FIGS. 2-3, the retention mechanism 210 may, according to further embodiments may include, two or more mechanism.

In other approaches, the retention mechanism 210 may use an attractive force, e.g., via a magnet and/or electromagnet.

The retention mechanism 210 in other embodiments may include a motor e.g., a servo motor, a worm screw/gear assembly, an actuator, etc., for causing movement of the flap 106 between the retracted position 306 and the deployed position 302. A latch, magnet, or the like may or may not be used in addition to the motor.

According to other embodiments, the retention mechanism may include a hinged spring for causing movement of the flap 106 from the retracted position 306 to the deployed position 302. For example, the hinged spring may apply a constant biasing force to the flap 106 when the flap 106 is in the deployed position 302, e.g., where the flap 106 is secured in the deployed position 302 by another portion of the retention mechanism, such as a tab (not shown), that releases the flap 106 from the deployed position 302 thereby allowing it to transition to the retracted position 306 when the tab is released. Moreover, the flap 106 may be transitioned, e.g., by the motor exceeding the applied biasing force, from the retracted position 306 to the deployed position 302, e.g., where the tab may engage and secure the flap 106 after being transitioned to the deployed position 302.

The retention mechanism 210 may also include a release tab configured to automatically and/or manually initiate the removal of an inserted data storage device, e.g., to release a data storage device from a coupling with the connector 216 on the back end 208 of the storage bay 102. For example, according to one embodiment, system 100 may include a push tab to allow a user to manually at least initiate the insertion and/or removal of a data drive from the storage bay 102.

The retention mechanism may be activated manually, e.g., via a mechanical connection that a user manipulates by hand, upon insertion or removal of drive via a mechanism activated by the insertion or removal, etc. In other approaches, the retention mechanism may be activated electronically. In further approaches, the retention mechanism may be activated by a combination of manual and electronic mechanisms. Where an electronic retention mechanism is used, control thereof may be as simple as actuation of a button or switch, or more complex such as controlled by a control circuit and/or host.

In a preferred embodiment, a management module 104 controls the retention mechanism via control signals. The management module described herein may be configured to detect presence, or equivalently absence, of a data storage device in the interior of the storage bay, e.g., storage bay 102, storage bay 400, storage bay 420, etc. (see operation 502 of method 500). The management module may be also be configured to control, e.g., by a controller, the retention mechanism in response to the detecting (see operation 506 of method 500). The management module 104 may also be configured to vary the speed of one or more fans in system 100, e.g., in response to detecting a loss of airflow impedance in system 100, e.g., based on a drop in pressure detected by a pressure sensor, based on feedback from a fan motor indicating lower resistance than a design value, etc.

Referring to FIG. 3, the control signals, e.g., passed from a management module 104 to the retention mechanism, may include signals that cause the flap 106 to transition from the deployed position 302 into the retracted position 306, and/or vice versa, along transition path 308. The control signals may also include signals that cause the retention mechanism 210 to deploy or release the flap 106 using the retention mechanism 210, e.g., releasing the flap 106 from the retracted position 306 or deployed position 302.

One advantage of system 100 is that a user does not have to keep track of removing removable drive fillers subsequent to an insertion and/or removal of a drive from the storage bay, due to the flap 106 of the storage bay 102 being positionable between the retracted position 306 and the deployed position 302 when a drive is removed. This helps prevent system downtime and/or overheating in the system, e.g., due to a loss of airflow impedance in the storage system in response to one or more missing drive fillers. This may also ensure that system 100 meets industry safety specifications.

Although the storage bays 102 of storage system 100 are shown in FIGS. 1-3 to include one flap 106, according to further embodiments, one or more of the storage bays of a storage system may include multiple flaps (see, e.g., FIGS. 4A-4C), and may have features and functionality as described in the examples above. In one approach, one or more storage bays may include at least two flaps. According to another approach, one or more storage bays may include at least three flaps. In embodiments where the storage bays include more than one flap (see e.g., FIGS. 4A-4C), the electronic connector may be configured to pass control signals from a management module to a retention mechanism that cause the one or more flaps to transition from the deployed position into the retracted position.

Figure 4A:
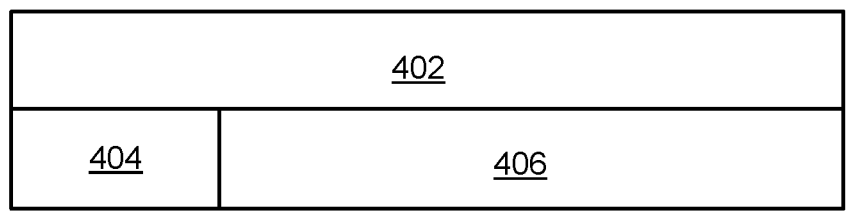
FIG. 4A is a storage bay with multiple flaps, in accordance with one embodiment.
Figure 4B:
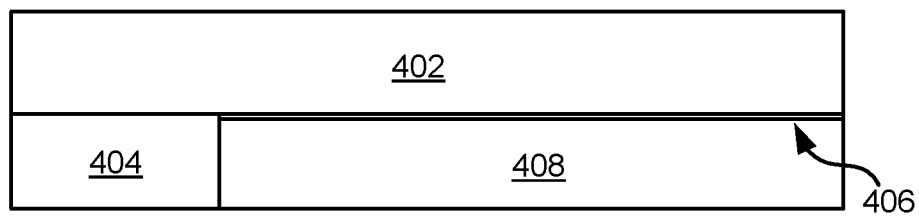
FIG. 4B is a storage bay with multiple flaps, in accordance with one embodiment.
Figure 4C:
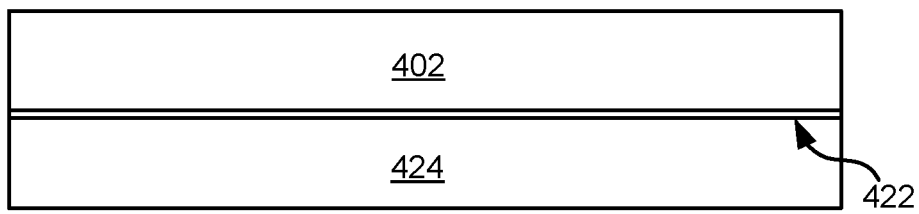
FIG. 4C is a storage bay with multiple flaps, in accordance with one embodiment.

FIGS. 4A-4C depict storage bays 400, 420 in accordance with various embodiments. As an option, the present storage bays 400, 420 may be implemented in conjunction with features from any other embodiment listed herein, such as those described with reference to the other FIGS. Of course, however, such storage bays 400, 420 and others presented herein may be used in various applications and/or in permutations which may or may not be specifically described in the illustrative embodiments listed herein. Further, the storage bays 400, 420 presented herein may be used in any desired environment.

Referring now to FIG. 4A, the storage bay 400 includes three flaps, e.g., first flap 402, second flap 404, third flap 406. The storage bay 400 may include peripheral sidewalls defining an interior dimensioned to receive up to three data storage devices therein, e.g., where the three flaps 402, 404, 406 (shown in FIG. 4A in the deployed position) correspond with three data storage slots.

The data storage slots of the storage bay 400 may each include any of the components, e.g., a retention mechanism, an electronic connector, a motor, etc., described in conjunction with the storage bay 102 of system 100.

For purposes of an example, the peripheral shape of the first, second and third flaps 402, 404, 406 together may be dimensioned to receive a standard 2.5 inch thin solid state drive (SSD). The peripheral shape of the second and third flaps 404 together may be dimensioned to receive a thin solid state drive (SSD). The peripheral shape of the third flap 406 may be dimensioned to receive a compact thin solid state drive (SSD).

A management module, e.g., the management module of the system which includes storage bay 400, may be configured to cause all of the flaps, e.g., flaps 402, 404, 406, to move towards the deployed position in response to detecting absence of a data storage device in the storage bay 400. For example, in FIG. 4A, the management module has caused all of the flaps 402, 404, 406 of storage bay 400 to move towards the deployed position based on detecting no data storage device in the storage bay 400.

With two or more flaps present in storage bay 400, e.g., flaps 402, 404, 406, the management module may also be configured to detect a type of data storage drive in the storage bay 400, e.g., in the interior of the storage bay 400, and determine which of the flaps 402, 404, 406 to move to the deployed position in response to detecting the type of data storage drive in the interior of the storage bay 400.

The type and/or size of data storage drive in the storage bay may be detected based on the management module software comparing the determined storage drive's hardware with a database of supported data storage drive types, e.g., pre-programmed into system management software. The type of data storage drive in the storage bay may also be detected based on a manufacturer's flag, e.g., where the flag is included in the storage drive's firmware.

In a further approach, the

The detection of storage drive types may be performed in response to the system, e.g., booting up, performing a power on self-test (POST), receiving a detection request from a user, etc.

The determining of which of the flaps to move to the deployed position may also be based on a geometry of the detected type of data storage drive, where the flap(s) block passage of substantial airflow through the storage bay upon moving into the deployed position. According to one approach, the determining of which of the flaps to move to the deployed position may be based on a determined drive speed of the detected data storage drive.

Referring now to FIG. 4B, a compact thin SSD 408 is shown populating the lower corner of the storage bay 400. In response to detecting the SSD 408 in the storage bay 400, the management module may determine that only the first and second flaps 402, 404 should be moved to the deployed position. Accordingly the third flap 406 is shown in the retracted position, and the first and second flaps 402, 404 are shown in the deployed position.

Referring now to FIG. 4C, the storage bay 420 includes two flaps, e.g., first flap 402, second flap 422. For purposes of an example, the peripheral sidewalls defining an interior of the storage bay 420, e.g., that corresponds with the first flap 402 and the second flap 404, may be dimensioned to each receive a standard 2.5 inch solid state drive (SSD).

A 2.5 thin SSD 424 is shown in the interior of the storage bay 420 that corresponds to the second flap 422. Accordingly the second flap 422 is shown in the retracted position. Because the drive slot corresponding to the first flap 402 does not include an inserted drive in FIG. 4C, the first flap 402 is shown in the deployed position, e.g., to substantially block airflow through the interior of the storage bay.

With the flaps of detected unpopulated drive bays being set to the deployed position, and the flaps of populated drive bays being in the retracted position, airflow may be substantially blocked from passing through the interior of the storage bays 400, 420, e.g., where the substantial blocking establishes a desired airflow impedance throughout the system(s) which includes storage bays 400, 420.

A preferred method for controlling airflow impedance in a storage bay, e.g., by positioning the flaps of the storage bay will now be described below.

Figure 5:
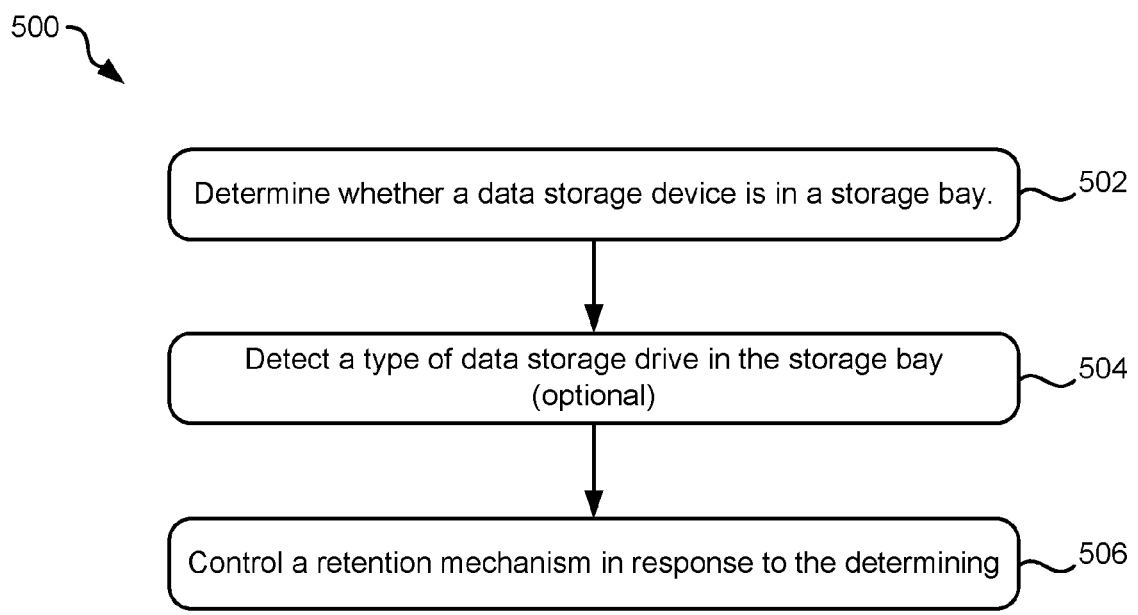
FIG. 5 is a method flowchart, in accordance with one embodiment.

FIG. 5 shows a method 500 for controlling airflow impedance in a storage bay, in accordance with one embodiment. As an option, the present method 500 may be implemented to systems including one or more storage bays such as those shown in the other FIGS. described herein. Of course, however, this method 500 and others presented herein may be used to form structures for a wide variety of devices and/or purposes, provide applications which may or may not be related to the illustrative embodiments listed herein. Further, the methods presented herein may be carried out in any desired environment. Moreover, more or less operations than those shown in FIG. 500 may be included in method 500, according to various embodiments. It should also be noted that any of the aforementioned features may be used in any of the embodiments described in accordance with the various methods.

Operation 502 includes determining whether a data storage device is in a storage bay. According to various embodiments, the determining of operation 502 may be performed by a controller. Moreover the determining may include, e.g., referencing a data table including the population statuses of storage bays, referencing the current position of a retention mechanism, determining by a method that would be appreciated by one skilled in the art upon reading the present disclosure, etc.

Operation 504 includes detecting a type of data storage drive in the storage bay. Operation 504 may be an optional operation of method 500, e.g., to be performed in embodiments where the determining of operation 502 provides a useful amount of information about the data storage device in the storage bay.

Operation 506 includes controlling a retention mechanism in response to the determining, e.g., determining of operation 502. The controlling of a retention mechanism in response to the determining, is described in detail elsewhere herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
    a storage bay having a peripheral sidewall defining an interior dimensioned to receive a data storage device therein,
    at least one flap coupled to the peripheral sidewall, the at least one flap being positionable between a retracted position and a deployed position, the at least one flap substantially blocking airflow through the interior of the peripheral sidewall when the at least one flap is in the deployed position, wherein the at least one flap does not significantly block airflow through the interior of the peripheral sidewall when the at least one flap is in the retracted position, wherein the at least one flap resides in the interior of the storage bay when the at least one flap is in the retracted position;
    a retention mechanism configured to retain the at least one flap in the retracted position, the retention mechanism being electronically controllable to cause the at least one flap to move toward the deployed position; and
    an electronic connector coupled to the retention mechanism and configured to pass control signals to the retention mechanism.

2. The system as recited in claim 1, wherein the at least one flap is biased, by a constantly applied biasing force, towards the deployed position.

3. The system as recited in claim 1, wherein at least two flaps are present, wherein in the deployed position, a shortest dimension of a front face of each of the at least two flaps are adjacent to one another.

4. The system as recited in claim 1, wherein at least three flaps are present.

5. The system as recited in claim 1, wherein the storage bay has at least one connector configured to mate with a connector of a data storage device.

6. The system as recited in claim 1, wherein the retention mechanism includes a latch for holding each of the at least one flap in the retracted position, wherein at least one flap is curled when the flap is in the retracted position.

7. The system as recited in claim 1, wherein the retention mechanism includes a motor for causing movement of each of the at least one flap between the retracted position and the deployed position.

8. The system as recited in claim 1, comprising a management module configured to detect presence of a data storage device in the interior of the storage bay and control the retention mechanism in response to the detecting.

9. The system as recited in claim 8, wherein at least two flaps are present, wherein the management module is configured to detect a type of data storage drive in the interior of the storage bay and determine which of the flaps to move to the deployed position in response to detecting the type of data storage drive in the interior of the storage bay.

10. The system as recited in claim 8, wherein the management module is configured to cause all of the at least one flap to move towards the deployed position in response to detecting absence of a data storage device in the storage bay, and vary a speed of one or more fans in response to detecting a loss of airflow impedance.

11. The system as recited in claim 1, wherein the at least one flap is oriented substantially perpendicular to the deployed position when the at least one flap is in the retracted position.

12. A method for controlling airflow impedance in a storage bay, the method comprising:
    determining whether a data storage device is in a storage bay; and
    controlling a retention mechanism in response to the determining, wherein the retention mechanism is configured to selectively retain at least one flap in a retracted position, the at least one flap being positionable between the retracted position and a deployed position, the at least one flap substantially blocking airflow through an interior of a peripheral sidewall when the at least one flap is in the deployed position, wherein the at least one flap does not significantly block airflow through the interior of the peripheral sidewall when the at least one flap is in the retracted position, wherein the flap is coupled to the peripheral sidewall at a front end of the storage bay, wherein the at least one flap resides in the interior of the storage bay when the at least one flap is in the retracted position.

13. The method as recited in claim 12, wherein multiple flaps are present, and comprising detecting a type of data storage drive in the storage bay and determining which of the at least one flap to move to the deployed position in response to detecting the type of data storage drive.

14. The method as recited in claim 13, wherein determining which of the at least one flap to move to the deployed position is based on a geometry of the detected type of data storage drive, wherein the at least one flap blocks passage of substantial airflow through the storage bay upon moving into the deployed position.

15. The method as recited in claim 12, comprising instructing the retention mechanism to cause one or more of the at least one flap to move toward a deployed position in response to determining that a data storage device is not present in the storage bay.

16. The method as recited in claim 12, comprising instructing the retention mechanism to cause all of the at least one flap to move towards the deployed position in response to determining that no data storage device is in the storage bay.

17. The method as recited in claim 12, wherein at least two flaps are present.

18. The method as recited in claim 12, wherein at least three flaps are present.

19. A computer program product comprising a computer readable storage medium having program code stored thereon, the program code executable by a computer to cause the computer to perform a process comprising:
 determining whether a data storage device is in a storage bay; and
 controlling a retention mechanism in response to the determining, wherein the retention mechanism is configured to selectively retain at least one flap in a retracted position, the at least one flap being positionable between the retracted position and a deployed position, the at least one flap substantially blocking airflow through an interior of a peripheral sidewall when the at least one flap is in the deployed position, wherein the at least one flap does not significantly block airflow through the interior of the peripheral sidewall when the at least one flap is in the retracted position, wherein the at least one flap resides in the interior of the storage bay when the at least one flap is in the retracted position.

20. The computer program product as recited in claim 19, wherein multiple flaps are present, and comprising detecting a type of data storage drive in the storage bay and determining which of the at least one flap to move to the deployed position in response to detecting the type of data storage drive.

21. The computer program product as recited in claim 20, wherein determining which of the at least one flap to move to the deployed position is based on a determined drive speed of the detected type of data storage drive, wherein the at least one flap blocks passage of substantial airflow through the storage bay upon moving into the deployed position.

\* \* \* \* \*